Dec. 12, 1961  R. T. GILBERT, SR., ET AL  3,012,391
COTTON HARVESTER ATTACHMENT
Filed Feb. 3, 1959  3 Sheets-Sheet 1

Robert T. Gilbert, Sr.
Robert W. Gilbert, Jr.
Dewey Gilbert
INVENTORS

BY Clarence A. O'Brien
and Harvey B. Jacobson
Attorneys

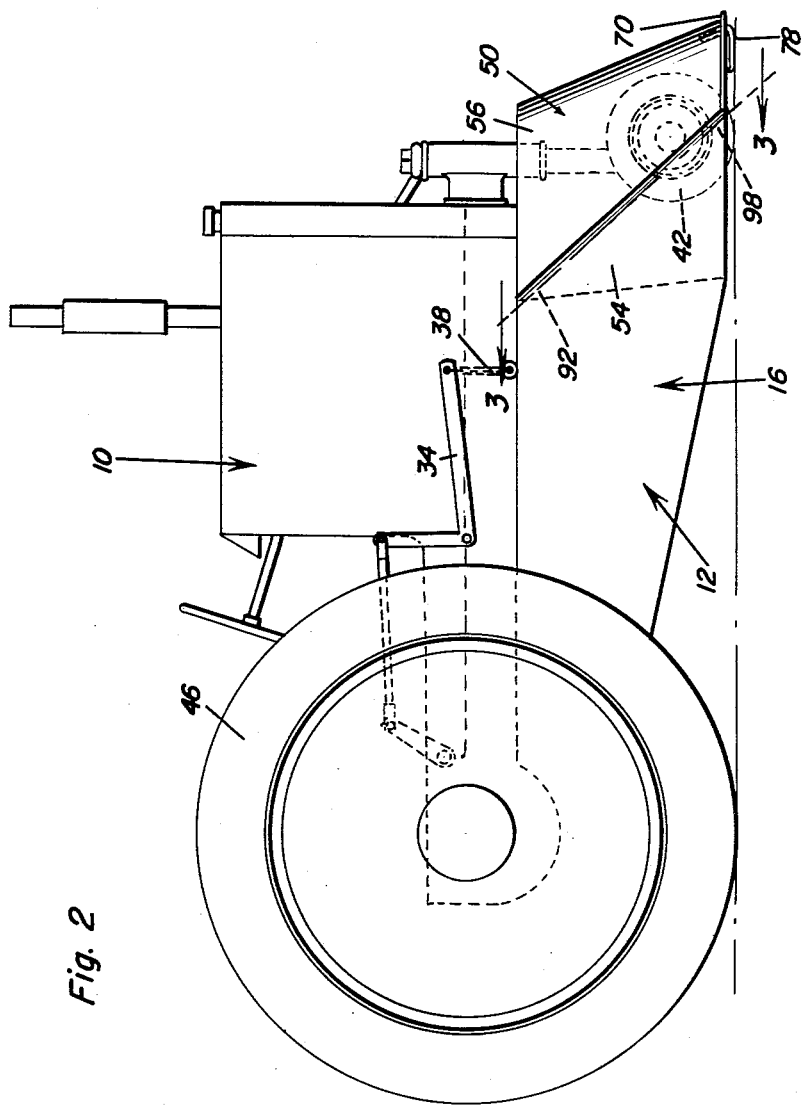

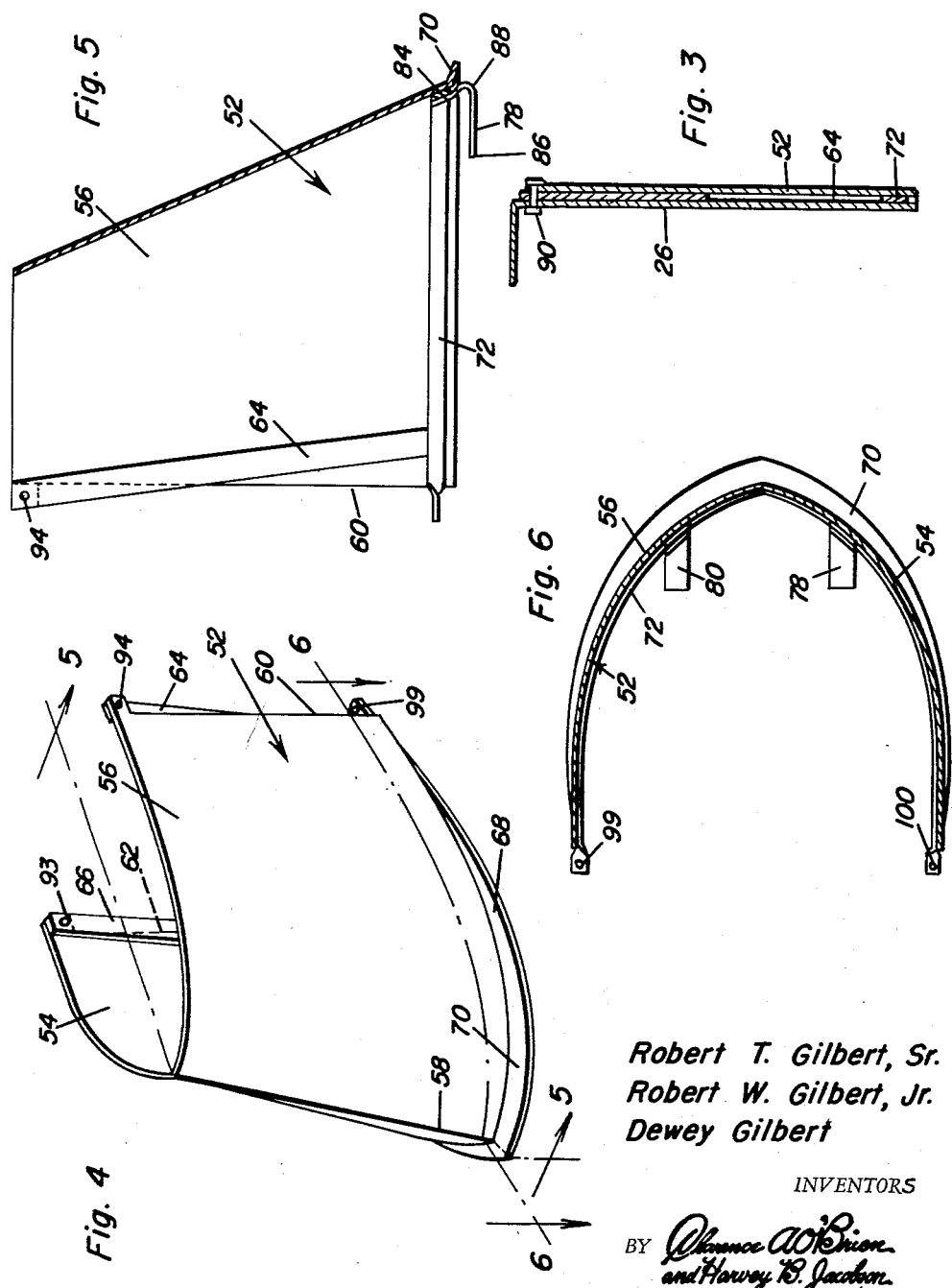

United States Patent Office 3,012,391
Patented Dec. 12, 1961

3,012,391
COTTON HARVESTER ATTACHMENT
Robert T. Gilbert, Sr., Robert W. Gilbert, Jr., and Dewey Gilbert, all of Rte. 1, Princeton, Tex.
Filed Feb. 3, 1959, Ser. No. 790,927
6 Claims. (Cl. 56—119)

This invention relates to attachments for cotton harvesters and more particularly to a cotton saving attachment for cotton harvesters.

The cotton saving attachment operates at the front of a tractor equipped with a cotton harvester, attaching to the inside front of the cotton stripper on both sides and at the top and bottom, and has for its object the straightening up of the cotton stalks to guide them into the front entrances of the cotton stripper so that the stripper can harvest the seed cotton from all of the stalks that are not standing erect.

Another object of the invention is to provide a cotton saving attachment for a tractor mounted harvester wherein there are means on the attachment projecting outwardly at the bottom thereof to aid in straightening up the stalks and keeping them up until they pass into the stripper. This has the distinct advantage of enabling cotton to be harvested from the stalks that are flat on the ground and which would ordinarily be passed over by the harvester strippers or run over by the front tractor wheels.

The cotton saving attachment is mounted at the front of the tractor, extending transversely across the tractor and located in advance of the front wheels of the conventional tractor. It has a curvature in horizontal cross-section to form smooth guides on the left and right side of a longitudinal center line of the tractor, guiding the cotton stalks into the stripper entrances.

An important feature of the invention which enables it to operate considerably more satisfactorily than previous guards, is that the cotton saver attachment projects in front of the tractor wheels and prevents the wheel from running over the stalks before they can enter the harvester strippers. Further, the cotton saver attachment is not mechanically connected to the tractor. On the contrary, it is solely supported by the strippers so that as they oscillate or as they are adjusted, the attachment is similarly oscillated or adjusted. The shape of the attachment is important because it straightens cotton stalks but does not break off the tall stalks. This is achieved by having the attachment furnished with smooth long curvatures in horizontal cross-section.

Another important feature of the invention is the lower baffle at the bottom edge of the attachment which protrudes forward a short distance and which rides very close to the ground. This baffle scoops up the cotton stalks which are flat or essentially flat on the ground and which would ordinarily be missed by the strippers as they are moved through a cotton field. The cotton saving attachment does not dig into the ground because there are one or more skids at the lower edge of the cotton saver attachment, which glide along the ground enabling the attachment to operate at a very low level to maintain a definite elevation above the ground regardless of its irregularities, as the tractor is moved forward through a cotton field.

Accordingly, a further object of the invention is to provide a practical, inexpensive and exceedingly effective cotton saver attachment for a tractor mounted pair of cotton strippers of a cotton harvester.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a side view of the invention as shown in FIGURE 1.

FIGURE 3 is a sectional view taken approximately on the line 3—3 of FIGURE 2.

FIGURE 4 is a perspective view of the cotton saver attachment.

FIGURE 5 is a sectional view taken on the line 5—5 of FIGURE 4.

FIGURE 6 is a sectional view taken on the line 6—6 of FIGURE 4.

Figure 1:
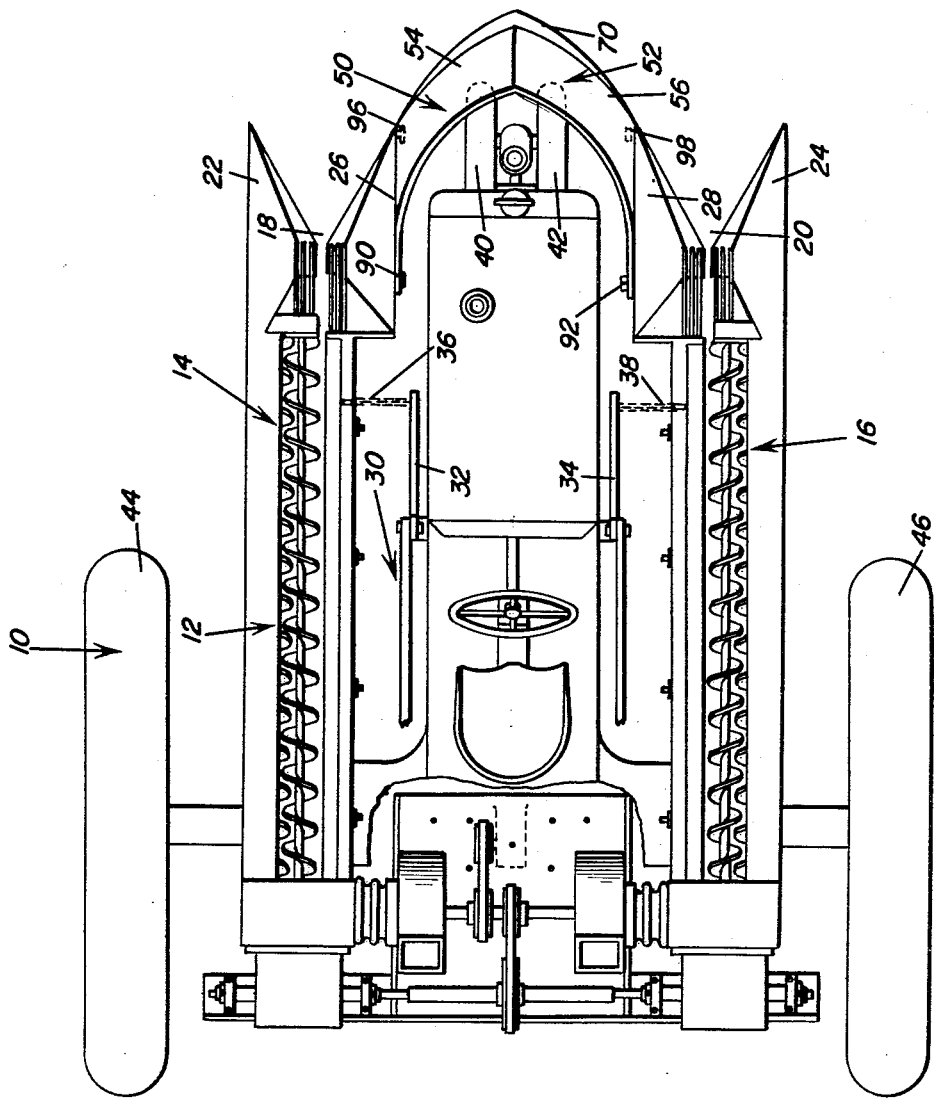
FIGURE 1 is a top view of the invention as installed in a conventional harvester assembly.

In the accompanying drawings (FIGURE 1) there is shown a conventional tractor 10 and a part of a cotton harvester 12 mounted on the tractor. The cotton harvester 12 has a pair of cotton strippers 14 and 16 which have cotton boll and stalk entrances 18 and 20 at the forward end thereof. The cotton entrances are formed by row guides 22 and 24 which have among other structures inner walls 26 and 28. Tractor 10, being conventional, has a tractor lift 30 provided with lift arms 32 and 34 to which chains 36 and 38 are secured. These chains are secured to the strippers 14 and 16 in order to adjust the strippers vertically in accordance with the desires of the tractor operator. Front wheels 40 and 42 are set close together and are located between the strippers 14 and 16, while the rear wheels 44 and 46 are ordinarily mounted on the outboard sides of the strippers 14 and 16. Since the tractor is absolutely conventional a further description thereof is deemed unnecessary. The cotton harvester 12 is also conventional as are the tractor mounted strippers 14 and 16 thereof. For example, present harvester strippers such as those illustrated herein, are shown and described in U.S. Patent No. 2,834,175, besides being commercially available and manufactured by several cotton harvesting equipment manufacturers.

Our improvement is a cotton saver attachment generally referred to by reference numeral 50 which is mounted in a particular location with reference to strippers 14 and 16 and tractor 10. The cotton saver attachment is made of a metallic hood 52 which is approximately parabolic in cross-section (FIGURE 6). Being made of sheet metal or material possessing similar structural characteristics, there is some resilience inherent in the hood due to its configuration. Although sides 54 and 56 of the hood are shown as having an apex 58, the hood may be made completely parabolic thereby eliminating the apex line. In either case the lower part of the attachment juts forward with reference to the front wheels 40 and 42 of the tractor a greater distance than the upper part thereof so that the front of the attachment does not extend absolutely vertically upward. Instead, it is slanted rearward and upward (FIGURE 2) and terminates at its sides in vertical edges 60 and 62. Reinforcing frame members 64 and 66, for instance flat metal bars, are welded, bolted or otherwise rigidly adhered to the side portions of the attachment hood or main body 52 at edges 60 and 62 thereof. The lower edge 68 of the hood 52 is turned out to form a forwardly jutting baffle 70 which is approximately crescent-shaped when viewed from above. Reinforcing member 72 fits flush against the inner surface of the lower part of hood 52 and is held fixed, for example by spot welding, bolting, riveting, etc. As seen in FIG. 5 the baffle 70 is directed forwardly and slightly downwardly with reference to the hood 52. Braces 64 and 66 are attached to reinforcing member 72, at the lower ends of the braces.

A pair of ground skids 78 and 80 are attached to the reinforcing member 72. The ground skids are made by angulated brackets having upstanding parts 84 secured to reinforcing member 50 and reticulated ground engaging parts 86 located at a level lower than baffle 70 and projecting rearwardly from the front edge thereof. (See FIGURE 5). The skid preferably has a smoothly curved leading edge 88 to guide the skid over the soil. The purpose of the one or more skids is to maintain baffle 70 and the entire hood 52 slightly elevated above the soil so that the baffle 70 will not dig into the soil as the attachment is propelled forward through the cotton field.

There are means securing the attachment to the cotton strippers 14 and 16. These means consist essentially of a pair of upper bolts 90 and 92 that are extended through apertures 93 and 94 at the upper ends of braces 64 and 66. These bolts are also secured in apertures of walls 26 and 28 of the cotton strippers thereby fastening the attachment at its upper rear corners to the strippers. The lower corners at the lower rear edges of the attachment are secured by bolts 96 and 98 passing through apertures 99 and 100 in the rear ends of reinforcing member 72 and through apertures in the walls 26 and 28 of strippers 14 and 16. Accordingly, the attachment 50 is secured solely to the strippers and therefore, it is movable and articulated with the strippers. Should the strippers move independent of each other through limited ranges of movement, the attachment 50 will yield and flex a limited amount. Should the strippers be elevated or lowered simultaneously with each other, attachment 50 will be correspondingly raised and lowered.

Attachment 50 is mounted in front of the wheels 40 and 42 of the tractor and occupies the full working space between walls 26 and 28 of the two strippers 14 and 16. In use, as the tractor is propelled through the cotton field, the tractor operator will try to maintain entrances 18 and 20 in perfect alignment with the cotton rows. However, the cotton plants are not always perfectly erect in perfect rows. There are always some cotton stalks which lean inwardly or which are flat on the ground between rows, and these are ordinarily missed by the strippers and run over by the tractor wheels 40 and 42. Attachment 50 occupying the space between the strippers 14 and 16 located in advance of the tractor wheels 40 and 42 and close to the ground, deflects these stalks into entrances 18 and 20 during normal use of the tractor-harvester assembly. Those stalks which are very close to the ground or on the ground are urged upwardly by the downwardly extending, forwardly jutting baffle 70 and then they are deflected by the smoothly curved sides 56 and 58 of the attachment 50, into entrances 18 and 20. It has been found that an appreciable increase in the harvesting yield is attained by using attachment 50 thereby eliminating the necessity of additional passes across the cotton field and eliminating the use of considerably more expensive equipment for recovering the fallen cotton or that cotton which is run over by the tractor wheels.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An attachment for a tractor that has front wheels and a cotton stripper mounted on each side of the front wheels and furnished with adjacent walls of cotton entrances to the strippers located on opposite sides of the front wheel of the tractor, said attachment comprising a pair of side walls having rear edges and a lower edge, said side walls being smoothly curved in cross-section, means rigidly connecting said stripper walls with said attachment walls for securing said attachment walls to said stripper walls on opposite sides of said tractor wheels, said attachment walls protruding in advance of said tractor wheels to deflect cotton located generally in advance of the tractor wheels toward said entrances, a forwardly jutting baffle extending substantially along the entire lower edge of said attachment walls to pick up cotton stalks laying close to the ground generally in advance of the tractor and between said strippers for subsequent deflection toward said entrances by said attachment walls.

2. An attachment for a tractor that has front wheels and a cotton stripper mounted on each side of the front wheels and furnished with adjacent walls of cotton entrances to the strippers located on opposite sides of the front wheel of the tractor, said attachment comprising a pair of side walls having rear edges and a lower edge, said side walls being smoothly curved in cross-section, means rigidly connecting said stripper walls with said attachment walls for securing said attachment walls to said stripper walls on opposite sides of said tractor wheels, said attachment walls protruding in advance of said tractor wheels to deflect cotton located generally in advance of the tractor wheels toward said entrances, a forwardly jutting baffle at the lower edge of said attachment walls to pick up cotton stalks laying close to the ground generally in advance of the tractor and between said strippers for subsequent deflection toward said entrances by said attachment walls, at least one ground skid having a ground engaging portion located at an elevation lower than said baffle and secured to said walls for maintaining said attachment walls and baffle at a slight elevation above the ground.

3. An attachment for a tractor that has front wheels and a cotton stripper mounted on each side of the front wheels and furnished with adjacent walls of cotton entrances to the strippers located on opposite sides of the front wheel of the tractor, said attachment comprising a pair of side walls having rear edges and a lower edge, said side walls being smoothly curved in cross-section, means connected with said stripper walls and connected with said attachment walls for securing said attachment walls to said stripper walls on opposite sides of said tractor wheels, said attachment walls protruding in advance of said tractor wheels to deflect cotton located generally in advance of the tractor wheels toward said entrances, a forwardly jutting baffle at the lower edge of said attachment walls to pick up cotton stalks laying close to the ground generally in advance of the tractor and between said strippers for subsequent deflection toward said entrances by said attachment walls, braces attached to said attachment walls for rigidifying said attachment walls.

4. An attachment for a pair of cotton strippers which have entrances at the forward ends thereof and walls at least partially defining said entrances, said attachment comprising a hood which is attached to said stripper walls and which occupies the space between the strippers extending approximately transversely thereacross, said hood having rearwardly diverging attachment walls having a lower edge, and means rigidly fastening said rearwardly diverging attachment to said stripper walls, portions of said attachment walls extending forwardly in advance of said entrances of said strippers to deflect cotton thereunto, a forwardly extending baffle at the lower edge of said attachment walls, said baffle inclined downwardly to guide the low laying cotton upwardly and over said attachment walls as the strippers are moved forwardly in a cotton field.

5. An attachment for a pair of cotton strippers which have entrances at the forward ends thereof and walls at least partially defining said entrances, said attachment comprising a hood which is attached to said stripper walls and which occupies the space between the strippers extending approximately transversely thereacross, said hood having rearwardly diverging attachment walls having a lower edge, and means rigidly fastening said rearwardly diverging attachment to said stripper walls, portions of said attachment walls extending forwardly in advance of said entrances of said strippers to deflect cotton thereunto, a forwardly extending baffle at the lower edge of said attachment walls, said baffle inclined downwardly to guide the low laying cotton upwardly and over said attachment walls as the strippers are moved forwardly in a cotton field, and at least one ground skid attached to said attachment walls and having a smoothly curved leading edge together with a ground engaging part to contact the surface of the soil and thereby prevent said baffle from digging into the soil.

6. An attachment for a tractor that has front wheels and a cotton stripper mounted on each side of the front wheels and furnished with adjacent walls of cotton entrances to the strippers located on opposite sides of the front wheel of the tractor, said attachment comprising a pair of attachment walls having rear edges and a lower edge, said side walls being smoothly curved in cross-section, means operatively connecting said attachment walls with said tractor in abutting relation to said strippers on opposite sides of said tractor wheels, said attachment walls protruding in advance of said tractor wheels to deflect cotton located generally in advance of the tractor wheels toward said entrances, a forwardly jutting baffle extending substantially along the entire lower edge of said attachment walls to pick up cotton stalks laying close to the ground generally in advance of the tractor and between said strippers for subsequent deflection toward said entrances by said attachment walls.

References Cited in the file of this patent

UNITED STATES PATENTS

| | | |
|---|---|---|
| 2,284,909 | Kuhlman | June 2, 1942 |
| 2,677,226 | Hyman | May 4, 1954 |
| 2,834,175 | Knowles | May 13, 1958 |
| 2,860,476 | Francis et al. | Nov. 18, 1958 |
| 2,966,024 | Pool et al. | Dec. 27, 1960 |